United States Patent [19]

Hennig et al.

[11] Patent Number: 4,583,116
[45] Date of Patent: Apr. 15, 1986

[54] METHOD AND APPARATUS FOR ELIMINATING DEFECTS IN IMAGES IN POLYCHROMATIC PRINTING DUE TO FAULTY REGISTRATION OF SUPERIMPOSED PRINTING OF COLOR SEPARATIONS

[75] Inventors: Eberhard Hennig, Ascheberg; Jürgen Klie, Toekendorf, both of Fed. Rep. of Germany

[73] Assignee: Dr. -Ing. Rudolf Hell GmbH, Fed. Rep. of Germany

[21] Appl. No.: 497,510

[22] Filed: May 24, 1983

[30] Foreign Application Priority Data

Jun. 4, 1982 [EP]  European Pat. Off. ........ 82104900.4

[51] Int. Cl.[4] ............................................. H04N 1/46
[52] U.S. Cl. ...................................... 358/75; 358/78; 358/80
[58] Field of Search ............................. 358/75, 80, 78

[56] References Cited

U.S. PATENT DOCUMENTS 4,464,677  8/1984  Kuhn et al. ........................... 358/80

FOREIGN PATENT DOCUMENTS 2360720  6/1974  Fed. Rep. of Germany .
1449126  9/1976  United Kingdom .

*Primary Examiner*—Michael A. Masinick
*Attorney, Agent, or Firm*—Hill, Van Santen, Steadman & Simpson

[57] ABSTRACT

Method and apparatus for eliminating image defects in polychromatic printing which arise due to lack of registration in the superimposed printing of individual color separations with different colored inks wherein from the four color separation signals M, C, Y and K the color separation signal which defines the contour is determined in the area of the contour. This color separation signal which corresponds to the color of the selected signal is replaced in the lighter or, respectively, darker area by the selected color separation signal and the color separation signals of the darker or, respectively, lighter areas which are adjacent to the lighter or, respectively, darker areas are retained unaltered so that the white streaks and imperfections of the prior art are eliminated.

5 Claims, 22 Drawing Figures

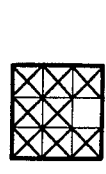 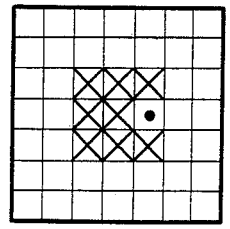 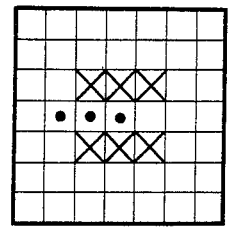
*Fig. 5a*   *Fig. 5b*
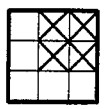 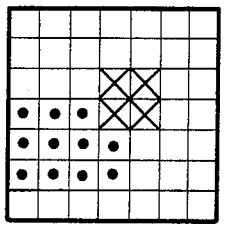 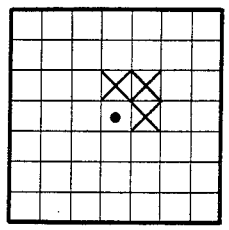
*Fig. 6a*   *Fig. 6b*
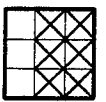 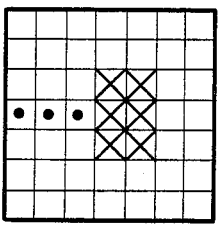 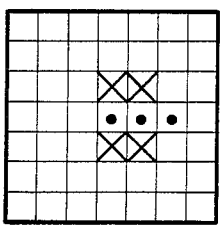
*Fig. 7a*   *Fig. 7b*
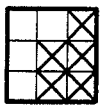 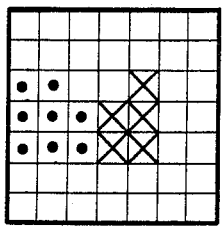 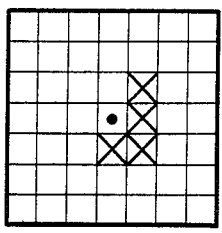
*Fig. 8a*   *Fig. 8b*

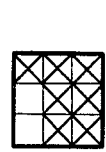 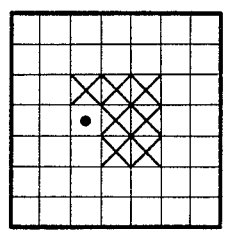 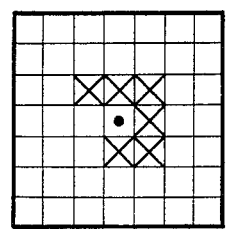
Fig. 9a   Fig. 9b
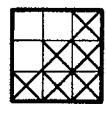 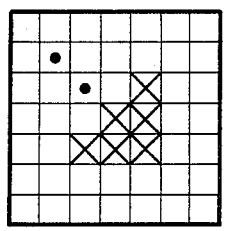 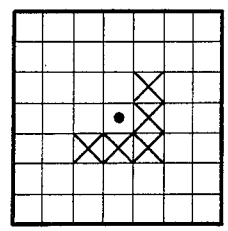
Fig. 10a   Fig. 10b
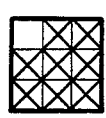 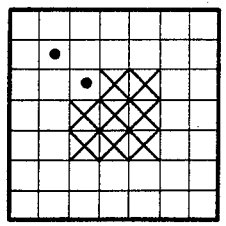 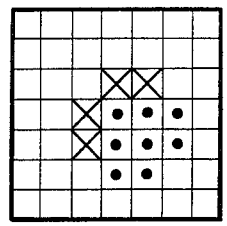
Fig. 11a   Fig. 11b

METHOD AND APPARATUS FOR ELIMINATING DEFECTS IN IMAGES IN POLYCHROMATIC PRINTING DUE TO FAULTY REGISTRATION OF SUPERIMPOSED PRINTING OF COLOR SEPARATIONS

BACKGROUND OF THE INVENTION

1. Field of the Invention

The invention relates in general to the field of polychromatic printing and relates to a method and apparatus for avoiding image defects which arise due to faulty registration caused by inaccurate superposition during printing of the color separations of the individual printing inks magenta (M), cyan (C), yellow (Y) and black (K) wherein an original image master is opto-electronically scanned and trichromatic primary measured color value signals red, green and blue are obtained during scanning and are converted into color separation signals for the printing inks magenta, cyan, yellow and black and the color separation signal control the production of the various color separations which are used for printing and wherein at the edges of the zones between one area of one color and another one color is displaced under the edge of the adjacent different color at the color separation boundaries so as to eliminate misalignment and inaccuracies of the prior art.

2. Description of the Prior Art

Present day standard polychromatic printing where subtractive color mixing is used, "flashers" which have a disruptive effect and reduce the image quality at the edges of color and also white passages occur wherein the white of the paper appears due to misregistration of the superimposed color separations of the colors in the printers and due to other causes as, for example, extreme color removal in the individual color separations are due to inaccurate registration during copying of the images.

A German OS No. 24 46 761 discloses a method for additive chromatic printing wherein dark color areas are reduced by a prescribed width and light color areas are expanded in the direction over the dark color areas so as to compensate for bleeding of the inks and to assure the meeting of the color areas during actual printing. With this type of printing, a color separation is produced for each individual printing ink color and depending upon the desired color placement, the color separations are inked with an ink having a prescribed color composition, for example, pink, violet or brown, etc. Based on the master, thus, the desired color pattern occurs by means of superimposed printing of the color separations even in the colors of the original master according to a selected color setting in another color pattern which is different from the original. Colors having a precisely fixed color composition are employed both in producing the original master as well as during printing so that on the one hand the colors can be exactly observed during the opto-electronic scanning of the original masters and on the other hand, so that the corresponding image portions or image pattern elements appear in the desired colors in the printing process.

This printing method makes it simple to avoid flashes appearing due to registration, misalignment or misregistration, color margins or, respectively, undesired overlaps or non-uniform widths of lines in dark color boundaries because an enlargement or reduction of the surfaces of the individual color areas is done in that dark color areas are reduced at all locations by a prescribed width and light areas are enlarged in the direction of and over a dark color areas. The criteria for accomplishing this method is simple since only two colors of a precisely defined color composition meet in the image portions which are being considered and when selected color settings are used it is easy to distinguish or, respectively, determine between the two colors which forms the lighter or, respectively, the darker areas. Also, the overall number of colors employed is limited to a low number such that a clear statement concerning this criteria can be obtained at any time.

When subtractive color mixing is utilized in polychromatic printing and recognition of individual colors does not proceed from the pattern master completely different conditions exist. A plurality of different colors can appear next to one another at image passages so that errors of the types described above can occur. This can be visualized from the fact that the individual printing inks can assume all intermediate values between 0 and 100% depending upon the color of the original master and that all colors of the color space can occur. Thus, unlike the method described in German OS No. 24 46 761 which of two colors at a contour is the lighter or, respectively, the darker is not identified but rather a determination must be carried out as to which of the color signals obtained during scanning of the original master is the brighter or darker printing ink.

SUMMARY OF THE INVENTION

It is therefore an object of the present invention to provide a method and apparatus which eliminates image defects occurring in polychromatic printing due to misregistration and faulty superposition during printing of the individual color separations.

It is also an object to provide method and apparatus for correcting errors during printing of color separations wherein an original master is opto-electrically scanned and the trichromatic measured primary color values of red, green and blue obtained during scanning are converted into color separation signals for the printing ink of magenta, cyan, yellow and black and where during the production of the color separations used in printing the respective edge zones of one color area of one color is shifted under the edge zone of another adjacent color at the boundaries between the two color areas and wherein the color separation signal which most determines the contour is determined in the area of the contour and the individual color separation signals are weighted with the factor characteristic for the respective color separation signals and the largest of the signals obtained is utilized as the contour determining color separation signal and it is further determined whether the darker color areas lies inside or outside of the contour based on the selected signal and the non-selected color separation signals of the darker area are replaced by the corresponding color separation signals of the lighter area.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIGS. 5a, 5b, 6a, 6b, 7a, 7b, 8a, 8b, 9a, 9b, 10a, 10b, 11a and 11b illustrate examples of matrices and different directions for overlapping according to FIGS. 4a and 4b.

DESCRIPTION OF THE PREFERRED EMBODIMENTS

Figure 1:
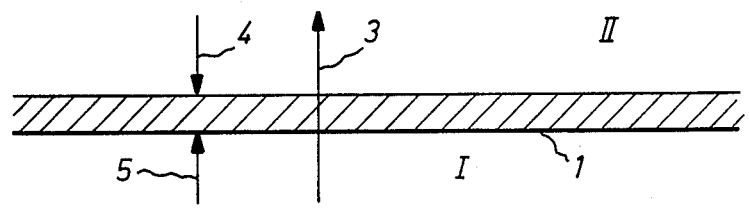
FIG. 1 is a schematic view for explaining overlapping at a contour.

FIG. 1 illustrates a contour 1 between a brigher area I and a darker area II. The arrow 3 indicates the direction in which overlapping is to be carried out. Arrows 4 and 5 indicate the edge of the overlap zone which is to have a prescribed overlap width.

Figure 2A:
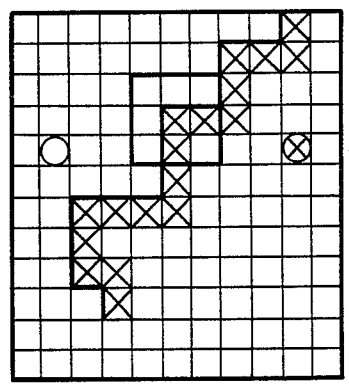
FIGS. 2a and 2b illustrate a contour subdivided into image points with a corresponding field for investigating the contour.

FIG. 2a indicates a contour which has a irregular course rather than the straight course illustrated in FIG. 1 and the corresponding image area is resolved into individual image points which are illustrated by square, mutually adjacent fields. The size of the individual image points arise during scanning from the respectively selected resolution or from the resolution at which the image data are deposited in a storage medium.

Figure 2B:
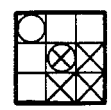

In FIG. 2a, the boundary between the light region I and the dark region II is indicated by image points illustrated with crosses and these image points belong to the darker color area II which determines the contour. A quadratic field R containing nine image points is defined by heavy line in FIG. 2a and is separately illustrated in FIG. 2b. By the use of these Figures, it will be explained how to determine whether the image point to be investigated lies inside or outside of the contour and also allows the overlapping direction to be determined. A circle with a cross in it indicates that the image point lies within the contour and a circle without a cross indicates that the image point lies outside of the contour.

In polychromatic printing when using subtractive color mixing, an image is reproduced by three or four printing inks which are printed on top of each other. Thus, the amounts of the three or four printing inks for printing yellow Y, magenta M, and cyan C or, respectively, black K are placed upon each image point. The amounts of these printing ink quantities which are determined by printing ink signals are also defined as color separation signals and they serve as a criteria for overlap in the present invention. Since the quantity of printing ink and, thus, the size of the color separation signals at mutually adjacent image points differ and since the contour occurs as a result of the boundary between a lighter and darker colored area in this invention the darker color area determines the contour.

In a first method step, therefore, the contour determining color is first identified at a transition using the corresponding color separation signals. First, the color separation signals Y, M, C and K of two adjacent image points are evaluated using color associated weighting factors. This requires that the separation signals be multiplied by factor $a_1$, $a_2$, $a_3$ or $a_4$. Since the individual colors participate in varying degrees in the visual contour impression, these factors vary from each other and the following factors were selected for the individual printing ink weighting factors in the present case which are 0.3 for yellow, 0.7 for magenta, 0.9 for cyan, and 0.2 for black. After the evaluation is made for each point, the maximum color separation signal associated with an image point is identified and the other neighboring image point is then compared to the maximum signal. The larger of these two signals then represents the darker color area which is the contour determining color and the maximum signal is the contour determining color separation signal. The contour thus occurs between these two image points.

As illustrated in FIG. 1, the width of the overlap zone in which overlapping is to be accomplished is prescribed. The contour determining color separation signal is retained unaltered within the overlap area for the individual image points of the darker color area II. For other color separation signals, these image points are replaced by the corresponding color separation signals of the adjacent lighter image point. The color separation signals are retained unaltered in the lighter image area I.

This process is reversed if a different overlap direction occurs.

Figure 3A:
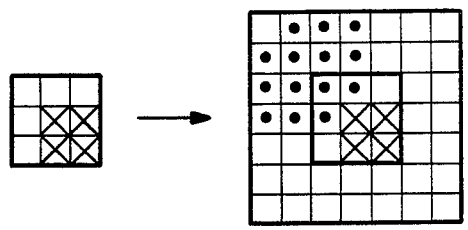
FIG. 3a illustrates overlapping from "inside" toward the "outside"
Figure 3B:
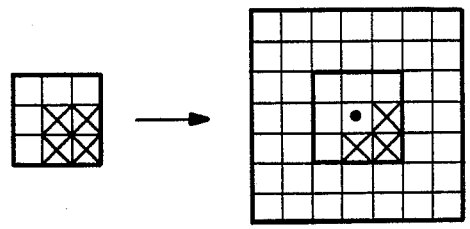
FIG. 3b illustrates overlapping in a direction from the "outside" toward the "inside"
Figure 4A:
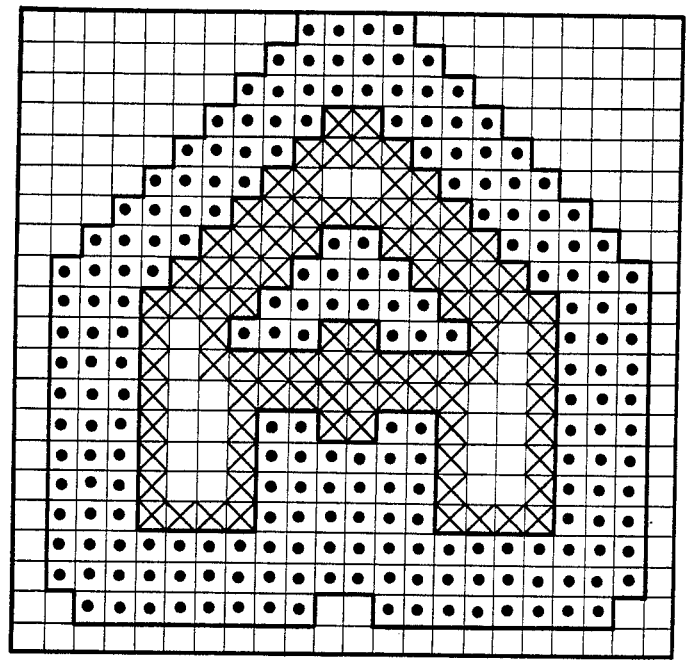
FIGS. 4a and 4b illustrate examples of an overlapping when copying a dark or a light letter.
Figure 4B:
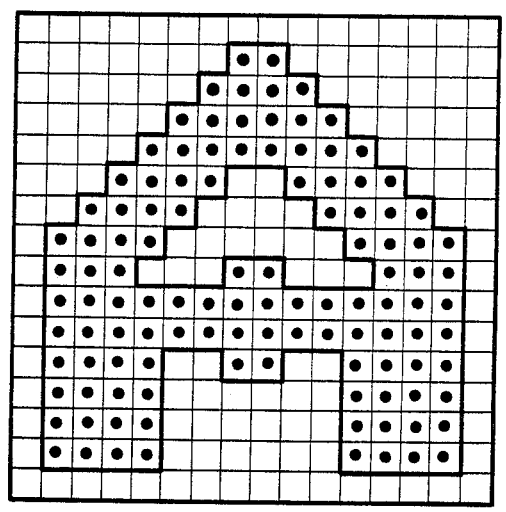

This is further explained using the two examples illustrated in FIGS. 3a and 3b. FIG. 3a illustrates overlap from the "inside" toward the "outside" on the basis of the corresponding directional and overlap matrices. FIG. 3b illustrates overlap from the "outside" toward the "inside". The corresponding overlap matrices are associated with the directional matrices illustrated at the left hand side of FIGS. 3a and 3b, respectively, and the image points which include dots in FIGS. 3a and 3b have been overlapped. This is also illustrated in FIGS. 4a and 4b for copying the letter "A". FIG. 4a shows overlapping operation for a light letter "A" surrounded by a dark environment and FIG. 4b illustrates overlapping operation for a dark letter "A" surrounded by a light environment. FIGS. 5a through 11a illustrate directional and overlapping matrices corresponding to the situation illustrated in FIG. 4a. FIGS. 5b through 11b illustrate the directional overlapping matrices corresponding to the situation illustrated in FIG. 4b.

Figure 12:
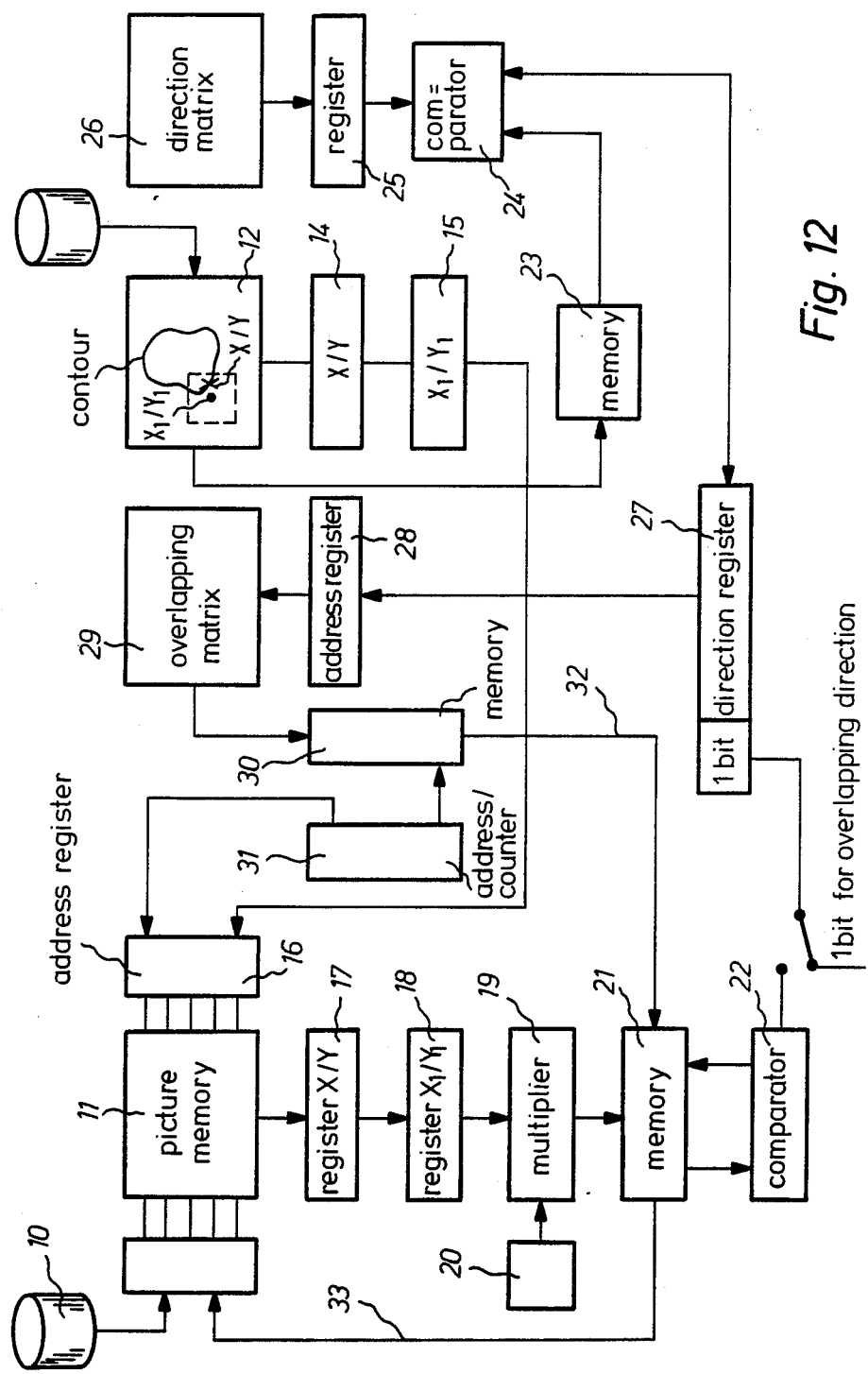
FIG. 12 comprises a block diagram of apparatus for practicing the invention.

FIG. 12 comprises a block diagram of the apparatus and for illustrating the various steps of overlapping operation. In FIG. 12, the color separation signals yellow, magenta, cyan and black of the original image are obtained and stored after opto-electronic scanning and digitization. For example, a known image processing system for printing technology may utilize a Chromacom system manufactured by Hell GmbH wherein after all reproduction oriented corrections and montages the image signals are obtained in the form of digitally stored color separation signals. Before using such data, the electronic production of the individual color separations, the output of a proof or the display of the printing results on a color monitor is accomplished. In such systems, the color separations Y, M, C and K are respectively stored on a magnetic disk storage having 8 bit coding. Such a disk storage 10 is illustrated in FIG. 12 and the digitized image signals of the color separation signals can be transferred from the disk storage 10 to a memory 11 through the input device. The memory 11 is 4×8 bits deep and has fast access.

In the apparatus of FIG. 12, the contours where the overlap operation are to occur are already known or have been identified and are deposited in a contour memory 12. Since the statement that a contour exist requires little information, it is sufficient that this memory 12 have only 1 bit depth. The contour can be carried out either by opto-electrically scanning of a contour mask, by inputting by means of a digitizer or by means of an automatic contour detection apparatus as described for example, in PCT application number DE No. 80/00069 which has been laid open.

So as to identify the contour determining color, the coordinates of the contour points are sent from the contour memory 12 into a register 14 and the contours of a neighboring point which does not lie within the contour mask are sent to an additional coordinate register 15. The memory 11 is addressed over an address register 16 with the coordinates of these two image points and the color separation signals associated with these image points are transferred into corresponding information registers 17 and 18 which are connected to memory 11. The registers 17 and 18 are connected to a multiplier 19 which receives an input from a coefficient memory 20 and supplies an output to an intermediate memory 21. The coefficients memory 20 supplies the coefficient $a_1$, $a_2$, $a_3$ and $a_4$ to the multiplier 19 for the color separation signals Y, M, C and K of the two image points and the multiplier multiplies the color separation signals with the coefficients and the results are stored in the memory 21.

Also, connected to the memory 21 is a comparator 22 which compares the signals evaluated in the above described manner to each other and identifies the maximum signal. This maximum signal represents the contour determining color separation signal and, thus, specifies which of the two image points is contour determining and a bit is set so as to register this decision. After the comparison has occurred, the color separation signals for the two image points are combined in the memory 21 according to the previously described overlap rule and are separately deposited. Thus, the color separation signal of the darker color which is the largest or maximum as well as the three other color separation signals of the neighboring point are stored for the contour point and the color separation signals are retained unaltered for the neighboring point.

If a different overlap direction is used, the color separation signals which corresponds to the contour determining color is assumed in the non-contour determining color separation signal by the contour determining image point and the other color separation signal of this point are retained. In this case, the color separation signals for the contour determining point are retained unaltered.

Independently of this selection of the maximum value, the direction in which overlapping is to occur, is determined in a further method step. For this purpose, the information from the memory 12 belonging to the coordinates of the image points stored in the registers 14 and 15 are read into a surround field memory 23 which is connected to the memory 12 as well as to a comparator 24. The comparator 24 is connected through a register 25 to a memory 26 in which the directional matrices illustrated in FIGS. 5a, 5b through 11a, 11b are deposited. The surround field of the contour points situated in the surround field memory is compared to these matrices and the matrices which coincide with the contour is identified. This particular matrix is then transferred into a register 27 and the matrix is numerically interpreted as a binary number and one bit is added in the register 27 said bit having been obtained during the evaluation of the contour determining color separations. This bit, on the other hand, can also be rigidly prescribed whereby the overlapping direction will be arbitrarily fixed. The content in the memory of register 27 is defined as directional operator and is forwarded as an address to an address register 28 which is connected to a memory 29 in which the overlapping matrices illustrated in FIGS. 4a, 4b through 11a through 11b are stored. With this address, the directional operator word than seeks the corresponding overlapping matrix from the memory 29 and the overlapping matrix associated with the contour point. As can be observed from FIGS. 5a, 5b through 11a through 11b the overlapping matrices indicate which image points are to be overlapped or, respectively, which image points are not to be overlapped.

Depending upon the prescribed overlap width, the size of the overlapping matrices is also determined and the corresponding matrices must be generated and be put into the memory before the overlapping operation.

After completion of the selection, the corresponding overlap matrix is supplied to a further memory 30 which is connected to an address counter 31. Starting from the address 0/0, the address counter counts the coordinate directions continuously in individual steps such that the individual image points of the overlapping matrix are interrogated in the x and y directions as to whether the individual image points should be overlapped or not. At the same time, the address counter 31 is connected to the address counter 16 of the memory 11 and addresses the appertaining image points there in the original image. The values 0 or 1 in other words, overlap or not to overlap obtained in the coordinate wise interrogation of the memory 30 are forwarded over a line 32 to the memory 21 and according to the 1 bit which is set therein, a decision is made as to which of the color separation signal combinations deposited in the memory replaced the corresponding image point in the original image. For this purpose, the memory 21 is connected by line 33 to the input of the memory 11. Thus, all points of the overlapping matrix are addressed through the counter 31 and the address input 16 of the memory 11 and the corresponding image point information are read out of the memory 21 so that the method can be completed.

Although the invention has been described with respect to preferred embodiments, it is not to be so limited as changes and modifications can be made which are within the full intended scope of the invention as defined by the appended claims.

We claim as our invention:

1. A method for avoiding image defects in polychromatic printing which occur at contours due to errors in the superimposed printing of the individual printing inks magenta (M), cyan (C), yellow (Y) and black (K), whereby an original image master is opto-electrically scanned and trichromatic, primary measured color values R, G, B are obtained during scanning, and are converted into color separation signals for the printing inks (M, C, Y and K) with said color separation signals controlling the production of the color separations employed in printing and wherein the respective edge zone of one color area of one color is shifted under the edge zone of an area of another color at contours in the color separations which are the boundaries between the color areas, comprising the steps of determining from the four color separation signals (M, C, Y and K), the color separation signal which most determines the contour in the area of the contour by weighting the individual color separation signals with a factor characteristic for the respective color separation ink color and the largest of the signals weighted is used as the contour-determining color separation signal, determining with the assistance of the selected signal as to whether the darker color area lies inside or outside of the contour, retaining the contour-determining color separation signal, and replacing the non-selected color separation signals of the darker area in a prescribed area by the corresponding color separation signals of the lighter area, and retaining the color separation signals of the lighter area which are adjacent to the darker area.

2. A method for avoiding image defects in polychromatic printing which occur at contours due to errors in the superimposed printing of the individual printing inks, magenta (M), cyan (C), yellow (Y) and black (K), wherein an original image master is opto-electrically scanned and trichromatic, primary measured color values R, G, B are obtained during scanning, said measured color values being converted into color separation signals which control the production of the color separation signals which control the production of the color separations employed in printing and whereby the respective edge zone of one area of a lighter color is displaced under the edge zone of an area of a darker color at contours or boundaries in the color separations, comprising the steps of determining which of the four color separation signals (M, C, Y and K), that most determines the contour in the area of the contour, weighting the individual color separation signals with a factor characteristic for the respective color separation ink color and the largest of the signals weighted in such manner is selected as the contour-determining color separation signal, replacing the color separation signal which corresponds to the color of the selected signal by the selected color separation signal in a prescribed area in the light area, and retaining the color separation signals of the darker area adjacent to the lighter area without change.

3. Apparatus for printing which avoids defects in polychromatic printing by overlapping comprising, storing a plurality of color separation signals in a first memory (11), storing a plurality of contour signals in a second memory (12), a first register (14) connected to said second memory (12) to receive coordinates of the contour points, a second register (15) connected to said second memory (12) to receive coordinates of points adjacent to the contour points, an address register (16) connected to said first memory (11) and said first and second registers (14, 15), third and fourth registers (17, 18) connected to said first memory (11), a multiplier (19) connected to said third and fourth registers (17, 18) and multiplying the color separation signals with a weighting function, and a third memory (21) connected to said multiplier (19) and to said first memory (11), a first comparator (22) connected to said third memory (21).

4. Apparatus for printing according to claim 3 further including means for determining the direction of overlap comprising a fourth memory (23) connected to said second memory (12), a second comparator (24) connected to said fourth memory (23), a fifth register connected to said second comparator (24), a fifth memory (26) connected to said fifth register (25), a sixth register (27) connected to said second comparator (24), a sixth register (28) connected to said fifth memory (26), and a sixth memory (29) connected to said sixth register (28).

5. Apparatus for printing according to claim 4 further including, a seventh memory (30) connected to said sixth (29) and third (21) memories, and an address counter (31) connected to said seventh memory (30) and to said address register (16).

* * * * *